United States Patent [19]
Guess

[11] Patent Number: 5,545,331
[45] Date of Patent: Aug. 13, 1996

[54] RECYCLE PROCESS FOR REMOVING DISSOLVED HEAVY METALS FROM WATER WITH IRON PARTICLES

[75] Inventor: Robert G. Guess, Manchester, Mass.

[73] Assignee: Romar Technologies, Inc., Danvers, Mass.

[21] Appl. No.: 386,700

[22] Filed: Feb. 10, 1995

Related U.S. Application Data

[63] Continuation-in-part of Ser. No. 218,891, Mar. 28, 1994, Pat. No. 5,462,270, which is a continuation-in-part of Ser. No. 160,240, Dec. 2, 1993, abandoned, which is a division of Ser. No. 893,978, Jun. 3, 1992, Pat. No. 5,298,168, which is a continuation-in-part of Ser. No. 682,129, Apr. 8, 1991, Pat. No. 5,122,279.

[51] Int. Cl.$^6$ .................................. C02F 1/62; C02F 1/70
[52] U.S. Cl. .................... 210/713; 210/719; 210/722; 210/911; 210/912; 210/913; 210/914
[58] Field of Search ................................ 210/712, 713, 210/719, 911, 912, 913, 914, 722

[56] References Cited

U.S. PATENT DOCUMENTS

| | | | |
|---|---|---|---|
| 4,566,975 | 1/1986 | Allgulin | 210/713 |
| 4,599,177 | 7/1986 | Hayashi et al. | 210/719 |
| 4,606,829 | 8/1986 | Rice et al. | 210/713 |
| 5,102,556 | 4/1992 | Wong | 210/719 |
| 5,122,279 | 6/1992 | Guess | 210/719 |
| 5,133,873 | 7/1992 | Catlin et al. | 210/719 |
| 5,298,168 | 3/1994 | Guess | 210/719 |
| 5,389,262 | 2/1995 | Guess | 210/719 |

*Primary Examiner*—Neil McCarthy
*Attorney, Agent, or Firm*—Bookstein & Kudirka, P.C.

[57] ABSTRACT

Heavy metal ions react with iron particles in acidic aqueous solution to form heavy metallic particles that are suitable for recycling and reuse when recovered from the aqueous solution. Chelating agents that are present are deactivated by bonding to ferrous ions produced from the iron particles. An alkali metal hydroxide is utilized to precipitate remaining heavy metal ions including ferrous and ferric ions which are recycled to the acidic aqueous solution.

28 Claims, 1 Drawing Sheet

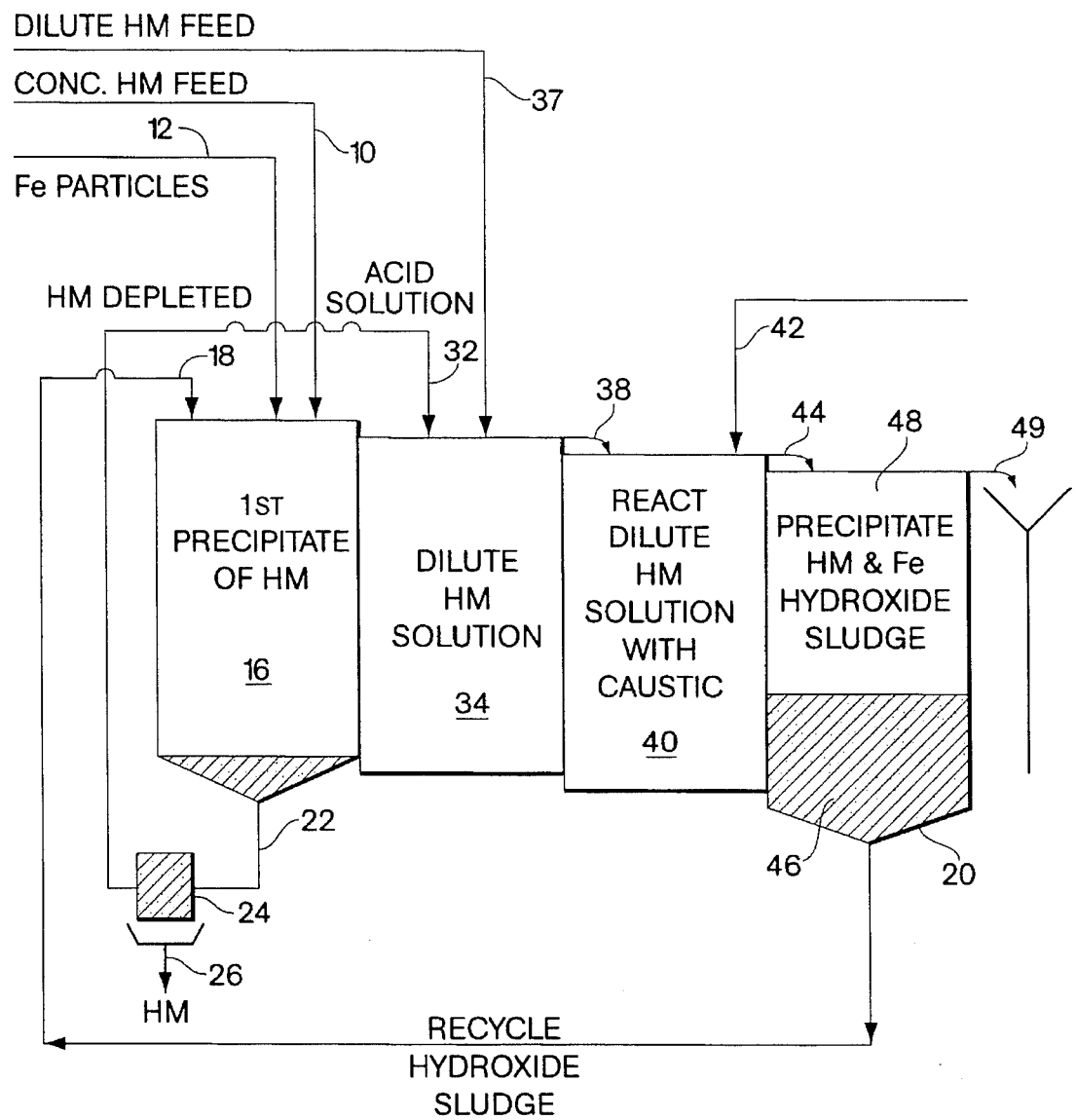

RECYCLE PROCESS FOR REMOVING DISSOLVED HEAVY METALS FROM WATER WITH IRON PARTICLES

REFERENCE TO RELATED APPLICATIONS

This application is a continuation-in-part of application Ser. No. 08/218,891, filed Mar. 28, 1994, now U.S. Pat. No. 5,462,270, which, in turn is a continuation-in-part of Ser. No. 08/160,240, filed Dec. 2, 1993, abandoned, which, in turn, is a divisional of application Ser. No. 07/893,978, filed Jun. 3, 1992, now U.S. Pat. No. 5,298,168, which, in turn, is a continuation-in-part of application Ser. No. 07/682,129, filed Apr. 8, 1991, now U.S. Pat. No. 5,122,279.

BACKGROUND OF THE INVENTION

This invention relates to a recycle process for effectively and completely removing heavy metals from aqueous solutions with iron particles. More particularly, this invention relates to such a process wherein heavy metals are reclaimed, hazardous sludge is substantially reduced or eliminated and an effluent having very low biological toxicity is produced. The present invention is useful for treating metal ion containing waste water generated by industries such as metal plating, metal surface finishing or printed circuit board manufacturing.

Prior to the present invention, it has been generally accepted that plating waste metals removed from alkaline solutions as metal hydroxide sludges must be handled as hazardous waste. Environmental Protection Agency (EPA) jurisdiction over these wastes is well established. When generated by an electroplating facility and shipped off site, such sludge materials are defined as categorical F006 hazardous waste. Transporting and receiving and processing of these materials even for reclamation and recycling, are restricted to EPA or State licensed operators. Due partly to this, and also due in part to the low metal concentration in such sludges, high recycling costs are incurred that usually exceed the recoverable value of the metals.

Metallic iron has long been known to react directly with certain other metals that are dissolved in acidic aqueous solution. The iron dissolves into the acidic solution and the other dissolved metal deposits a metallic layer on the surface of the iron. Referred to as metallic replacement or cementation, this characteristic of metals has commonly been used in the commercial extraction of copper from ores and acid leaching of mine tailings. After some time, the surface of the iron is so covered with other metal that the iron becomes unreactive and the reaction ceases.

U.S. Pat. No. 3,902,896 addresses this limitation and discloses the use of a soluble thiosulfate compound to aid the cementation of such metals as copper, silver, gold and platinum group metals from aqueous solutions. The patent discloses that the cemented metal flakes off the base metal, exposing fresh surfaces. Two properties of thiosulfate limit its utility for this purpose. In strong acid solutions, thiosulfate decomposes to sulfur dioxide and elemental sulfur, which is colloidal and coats all surfaces it contacts. Also, dilute thiosulfate solutions are very corrosive on ferrous alloys, particularly on stainless steel materials.

U.S. Pat. No. 3,634,071 describes the use of sulfur dioxide for reducing ferric ions contained in recirculated ore leaching acid solutions. Some improvements in the cementation of copper using metallic iron were observed as relating to decreased oxidation of the iron and copper metals by ferric ions.

U.K. Patent Application GB 125828 A, filed Jun. 16, 1983 discloses a process for removing copper ion from solution by contacting the solution with steel wool, converting only a small portion of the iron into copper. This process is commercially undesirable due to 1) the uneconomically low conversion of iron to copper, and 2) the high cost of steel wool and 3) the high labor cost for handling the materials. The recovered copper has a lower recycling value due to the cost of processing required for separating it from the residual steel wool fibers.

Many other methods exist for removing heavy metal ions from aqueous solutions, and which are commonly practiced in the pretreatment of industrial waste-waters containing environmentally toxic metals. When dissolved heavy metal solutions are free of chelating agents, they can be effectively treated by simply admixing an alkaline or caustic compound to precipitate the insoluble metal hydroxide. Sodium hydroxide, soda ash, lime or magnesium hydroxide slurry are all used to do this. Unfortunately, such processes generate large volumes of hydroxide sludge which must be disposed of in an environmentally safe manner.

Frequently, however, complexing ammonium ions of chelating compounds such as the sodium salts of etheylene-diaminetetra-acetic acid (E.D.T.A.) and others having similar properties are present. They occur as ingredients in the used plating baths, cleaners and brighteners drained into the waste-water. In such cases, it is necessary either; 1) to use a strong chemical that breaks the chelant-to-heavy metal bond and forms a stable, insoluble compound or complex of the toxic metals, or 2) to add a substance that exerts a stronger attraction for the chelant than does the toxic metal ion, to free the heavy metal to precipitate as an insoluble hydroxide. Processes of both types are currently practiced.

Sodium sulfide is used to effectively precipitate heavy metals. Its sole advantage is the extremely low solubility of most heavy metal sulfides. Most are capable of existing in the presence of even the strongest chelating agents. Undesirable aspects of using a sulfide process include the extreme toxicity of hydrogen sulfide gas which can be generated by contacting the sulfides with strong acids. Also, metal sulfide precipitates are slimy and difficult to filter. Large quantities of flocculants and filter aids are used, generating large volumes of sludge and corresponding high disposal costs.

Sodium borohydride is a strong, water soluble reducing agent that has an advantage of producing a compact semi-metallic sludge. There are several reasons for its not having broad acceptance for heavy metal removal in waste-water treatment: 1) it is very expensive, 2) precipitated metals easily reoxidize and redissolve in the presence of dissolved ammonia, 3) dangerous concentrations of potentially explosive hydrogen gas can accumulate in the space above a reaction using sodium borohydride, and 4) at times when pH is not controlled perfectly, reactions occurring at an elevated pH of 8 or higher give off toxic fumes of hydrogen sulfide gas, dangerous to workers and sensitive equipment.

Hydrazine is another strong reducing chemical capable of breaking a metal ion bond to chelants. It is used to a limited extent for heavy metal removal, but like borohydride, it too is very expensive to use and it too can generate dangerous volumes of hydrogen gas when acidified. Hydrazine has also been placed on a list of chemicals suspected of being carcinogenic. This has been a major impediment to its industrial use.

Several compounds have been used that form insoluble metal complexes with heavy metal ions. All exert a stronger attraction to the metal ion than the chelants normally occurring with the metals in the waste-waters. Insoluble starch xanthate is one such material, reportedly effective at complete removal of dissolved metal from the water. Its drawback is its generation of huge volumes of sludge, which retains a high water content and costs the user a severe penalty for disposing of same as a hazardous waste.

Other such complexing agents have gained widespread us including sodium dimethyldithiocarbamate (D.T.C.), and sodium diethyldithiocarbamate (D.E.T.C.). These are fairly effective at completely removing the heavy metal ions from solution. However, D. T.C. products require costly reclaiming in order to recycle the recovered heavy metal. The precipitate is light in density and difficult to gravity settle. The sludge often floats on water and it also gives off a foul smelling odor that is characteristic of the D.T.C. products. In addition, the dithiocarbamate compounds exhibit acute biological toxicity toward aquatic plant and animal species. Sodium dimethylidithiocarbamate is also used as the active ingredient in several EPA registered pesticide products.

At the present time, strict biological toxicity standards are being enforced upon industries by municipal sewerage authorities. Effluent toxicity is measured by placing live specimens of plant and animal species in diluted samples of such treated waste-waters. Recent data indicate that interactions exist between very low concentrations of certain heavy metals such as copper and silver, and certain anions such as nitrate, which produce more toxicity than is attributable to each component by itself. The implication of these developments is that even lower levels of removal of heavy metal ions from industrial effluents is required. A costly evaluation of background toxicity factors is required when an industry's effluent fails to meet specific toxicity limits.

All chemical methods for removing heavy metals from industrial wastes and waste-waters that are of practical use and in actual practice involve chemical reductions to metallic form and others produce metal compounds either insoluble organo-metallic complexes or metal sulfide or hydroxide sludges. The sludges of all these processes are fairly soluble in acidic water and the heavy metals are rapidly redissolved if the material is exposed to strongly acidic water.

The conventional waste-water treatment process, perhaps most frequently used by the largest number of industries, uses ferrous sulfate heptahydrate powder. Ferrous ion is substituted at a controlled acidic pH of about 2 to 3, to replace toxic heavy metal ions that are bonded by chelating agents. This allows the heavy metal ions to be rendered insoluble as hydroxides which are precipitated from an alkaline solution.

In the presence of strong chelants or free ammonia dissolved in alkaline solutions, a large excess of this source of ferrous ion is required. Normally, 5 to 10 ferrous ions are added for each copper ion being removed from chelated waste-waters. In heavily chelated streams, as many as 25 to 30 ferrous ions per heavy metal ion may be required in order to prevent the chelants from dissolving the heavy metal hydroxide. The commercial ferrous sulfate has seven waters of hydration and is only about 20% iron by weight. In some cases, over 100 pounds of ferrous sulfate powder is added to the waste-water for each pound of chelated or ammoniated copper removed, thereby generating 60 to 80 pounds of sludge.

In typical treatment systems, each additional pound of iron used adds about 4 pounds to the weight of sludge made. This can be reduced to about 3 pounds of dry sludge per pound of iron if a sludge dryer is used. When ferrous sulfate is dissolved into waste-water, it causes acidity in the water. Each mole of iron introduced this way requires using two moles of sodium hydroxide to neutralize the iron and form ferrous hydroxide. Therefore, when large excess amounts of ferrous sulfate heptahydrate powder are used, the total chemical cost for treatment is compounded. Higher hazardous waste sludge disposal costs are also incurred.

It has been proposed in U.S. Pat. No. 5,102,556 to recycle ferric hydroxide sludge which may contain occluded heavy metals in order to produce ferrous chloride. The ferrous chloride is utilized in a process known as Unipure process described in U.S. application Ser. No. 042,565 filed Apr. 16, 1987 and U.S. application Ser. No. 07/359,872 filed May 1, 1989. In this process, an aqueous solution of heavy metals and a ferrous component, e.g., ferrous chloride is rapidly oxidized, usually by air injection to produce a sludge containing the heavy metals and ferric or oxyferric hydroxide. This sludge is recycled to produce the ferrous chloride in a two step procedure. In the first step the sludge is reacted with hydrochloric acid to produce dissolved ferric chloride. In the second step, the ferric chloride is reacted with iron, usually in the form of iron powder to produce the ferrous chloride. Intermediate filtration steps can be utilized to remove undissolved species such as unreacted iron, metal chlorides or hematite. This process is inefficient and undesirable since valuable reducing capacity of metallic iron is consumed in converting ferric ion to ferrous iron rather than being consumed to reduce dissolved heavy metal ions to heavy metals precipitate that can be easily recovered. In addition, the use of an oxidation step on the heavy metal solution containing iron limits its utility for treatments of solutions containing chelated heavy metals since the presence of a strong oxidation potential enhances the attraction of the chelating agents for the heavy metals and decreases the bonding attractions between the chelating agents and the dissolved ion. As a result the tendency of the heavy metals to remain dissolved is increased. To overcome the disadvantage, the Unipure process is required to use excessively high ratios of iron to heavy metal in the water treatment process that employs such oxidation of the iron. This results in an increased consumption of iron and a net increase of the amount of process sludge produced. Typically an increase of 1 part by weight of net metallic iron results in a net increased production of about 5 to 10 parts by weight of iron bearing wet filter cake that must be disposed of.

U.S. Pat. No. 5,039,428 discloses a process for removing heavy metals from water by effecting precipitation on the surface of particles having alkaline surface activity and to produce a waste water stream. Alkaline reagent is added to a portion of the waste water to render the particle surfaces alkaline active. The activated particles then are recycled to the precipitation step. A second portion of waste water from the precipitation step is filtered to produce sludge and water, free of particles and sludge. This process does not involve a reducing step to form heavy metal particles.

It would be highly desirable to provide a safe, simple, reliable and economical process for removing heavy metals from aqueous solutions that would:

1) yield a superior quality aqueous effluent that is low in biological toxicity and compliant with all regulations for discharging into a public sewer or waterway, and, 2) eliminate producing an F006 hazardous waste sludge that is normally generated at an alkaline pH and usually has a lower metal content, and 3) reclaim the metals in a concentrated metallic form that yields a net positive value when recycled, and, 4) use readily available and economic materials that are non-hazardous and do not cause irritating or foul odors or explosive gases.

SUMMARY OF THE INVENTION

The process of this invention comprises three distinct steps which produce solid heavy metal particles which are recovered, slurries which are recycled within the process and a non-toxic effluent.

The present invention provides a means for minimizing the net production of iron hydroxide sludge. By recycling metal hydroxide sludge within the process, a plentiful amount of inexpensive ferrous ions is available for treating chelated heavy metal ions in a dilute aqueous solution with a minimized consumption of iron into the process. Thus, recycling of the ferrous ion-rich hydroxide sludge substantially decreases the amount of iron particles needed to reduce heavy metal ions to solid recoverable heavy metal particles. This decrease, in turn, substantially decreases the amount of sludge which must be removed from the overall process.

Recycling of ferrous ions contained in a ferrous-rich heavy metal hydroxide sludge that is produced by the treatment of a dilute aqueous solution of chelated heavy metals, to admixture with a concentrated acid solution, such as concentrated acidic heavy metal aqueous solution, followed by subsequent admixture with metallic iron particles results in the precipitation of solid metallic heavy metal particles suspended in an acidic solution of concentrated ferrous ions. Upon removing the heavy metal particles from said suspended form, said ferrous solution can be added to more of said dilute chelated heavy metal aqueous solution to provide the needed ferrous ions for freeing the heavy metal ions from being bound to the chelant.

Thus, recycling of the ferrous ion-rich hydroxide sludge substantially decreases the amount of iron particles needed to reduce heavy metal ions to solid recoverable heavy metal particles. This decrease, in turn, substantially decreases the amount of sludge which must be removed from the overll process.

In accordance with a first step of the present invention, iron particles are reacted with concentrated heavy metal ions in acidic water at a pH between about 0.1 and 4, preferably between about 1 and 2 in a novel process which includes a recycle step. Heavy metals are provided from redissolved heavy metal hydroxide sludge recycled to the first step from a third step described below. Heavy metal ions can also be provided in the concentrated acid aqueous solution used for dissolving the heavy metal hydroxide sludge. Ferrous ion is provided from recycled and redissolved ferrous hydroxide also contained in said sludge from the third step. The iron particles reduce the heavy metals ions to zero valence. The reducible heavy metals form metallic particles that are suitable for economical recycling and reuse. The heavy metallic particles are recovered by gravity settling or filtering from the acidic solution.

The acidic supernatant liquid from the first step contains dissolved ferrous ions. It is useful in this process for treating dilute solutions of chelated heavy metals such as process rinse waters. When the residual liquid of the first step is added to a dilute acidic solution of chelated heavy metals, the second chemical reaction step of this process occurs.

The liquid effluent from the second step is directed to the third step, and the dilute solution is neutralized to an intermediate pH, between about 5 and 10, preferably between about 7 and 9, by adding a suitable caustic alkaline compound. At a pH between about 5 and 10, heavy metal hydroxides co-precipitate with ferrous hydroxide from the solution as a dense, fast settling mixture. This settled metal hydroxide slurry is found to be further useful in this process for neutralizing the strong acidity contained in some of the concentrated metal plating and etching and regenerant solutions being reclaimed in the first step of this process. The metal hydroxides are an effective substitute for purchased new caustic. The heavy metal content in the hydroxide slurry of the third step is effectively concentrated at a higher concentration than occurring in the dilute solution, which provides for a more efficient performance of the reduction in the first step that forms metallic particles of the heavy metal. The slurry produced in the third step can be recycled to the first step, the second step and/or the third step. A portion of the slurry can be withdrawn from the process for disposal in order to control the iron inventory within the process, thereby to avoid excessive build-up of iron in the process.

The resulting liquid effluent is extremely low in heavy metal ion concentrations, generally below detection levels of atomic absorption spectrophotometry. When no precipitated alkaline heavy metal hydroxide or ferrous hydroxide or any mixture thereof are withdrawn and disposed of, then it can be fairly stated that this process totally eliminates the generation of such regulated F006 sludges. When the process contains sufficient chelant to form a sufficient amount of iron chelates, none of the hydroxide-rich slurry need be removed from the process in order to control iron inventory within the process.

The process of this invention provides substantial advantages over prior art processes. The aqueous effluent has low or no biological toxicity and very low or no heavy metal content. Hazardous sludge is reduced or eliminated. Reusable valuable heavy metal is recovered. In addition, the present invention, primarily by virtue of the recycling step, provides more efficient use of raw materials and provides reduced overall operating costs.

The process of this invention reclaims heavy metals as metallic particles from both concentrated and dilute aqueous acidic solutions. Heavy metals are removed from the dilute heavy metal solutions as heavy metal hydroxides. These heavy metal hydroxides are recycled and redissolved in the concentrated metal solutions from which the metallic particles are produced.

A superior quality treated waste-water is produced that is low in biological toxicity and meets the strictest EPA and State environmental standards for discharge of liquid effluent to a public sewer. This new improved process provides a method for closed-loop recycling of materials that are presently disposed of as hazardous waste. This process also provides the means for minimizing and balancing chemical raw materials usage by a novel method that can totally eliminate generating any regulated F006 hazardous waste sludge.

BRIEF DESCRIPTION OF THE DRAWINGS

The FIG. 1 is a schematic diagram illustrating the process of this invention.

DESCRIPTION OF SPECIFIC EMBODIMENTS

In accordance with the method of this invention, iron particles are utilized in a first step to precipitate heavy metals from concentrated aqueous solutions. The metallic iron reduces the heavy metal ions to form heavy metal particles in accordance with Equation 1.

$$Fe°+HM^{++} \rightarrow HM°+Fe^{++} \qquad \text{(Equation 1)}$$

The reaction defined by Equations 1 is effected at a pH between about 0.1 and 2, preferably between about 1 and 2.

When chelating agents are present in the dilute aqueous solutions being treated, the ferrous ions produced in Equation 1 are also beneficially utilized by bonding to chelating agents [CA=] which were previously bound to heavy metal ions. This reaction is defined by Equation 2.

$$Fe^{++}+[CA^=].[HM^{++}] \rightarrow [HM^{++}]+[CA^=].[Fe^{++}] \qquad \text{(Equation 2)}$$

A practical trade off between faster reactions at lower pH values versus more efficient use of reactants at higher pH values is required which may result in varying choices from solution to solution being treated.

The present invention permits the use of a reactor vessel of suitable design for the first step reaction which allows the finely divided heavy metal particles to settle from the supernatent liquid. By gravity settling, a thick dense slurry of the heavy metals can be recovered. Filtering this slurry and rinsing and drying the recovered solids produces a concentrated, highly metallic form of material, suitable for recycling and reuse of the metals in other processes.

In accordance with the process of this invention, iron particles are utilized to reduce heavy metal ions to metallic particles of said heavy metals. By the term "heavy metal" as used herein, is meant a metal having:

1) an atomic weight heavier than calcium, that is greater than 40.08, and 2) its compounds exhibit biological toxicity when released into the environment. Representative heavy metals include copper, zinc, nickel, tin, lead, cadmium, cobalt, mercury, chromium, zinc, manganese, silver, gold, platinum, palladium, vanadium, arsenic, antimony, bismuth, indium, rhodium, ruthenium, technetium, molybdenum, niobium, osmium, iridium, uranium, plutonium, lanthanides, actinides and mixtures thereof.

While the size of the iron particles is not critical to the present invention, faster reactions are obtained with smaller particles of iron. More finely divided particles provide a greater surface area. Since this heterogeneous reaction between iron and heavy metal ions occurs on the surfaces of the iron particles, the greater the area of exposed surface, the faster the rate of reaction that occurs. Thus, the particles typically have a size less than about +10 mesh, preferably less than about +100 mesh, and most preferably, less than about +325 mesh.

Upon removing the reclaimed metallic particles from the liquid of the first step, the residual acidic liquor contains dissolved ferrous ions. This residual solution is found to be highly useful as an effective reagent for supplying ferrous ions for the removal of heavy metals from dilute chelated heavy metal solutions, such as chelated metal process rinse waters in a second stage reaction. Such dilute solutions typically have dissolved heavy metals in a concentration of between 10 and 100 milligrams per liter.

The residual liquid from the first reaction step is added as reagent into a second step where reaction occurs in a dilute acid aqueous solution of chelated heavy metals.

In the second step reaction, chelated heavy metal ions react in accordance with Equation 2, with ferrous ions at a pH between about 1 and 5, preferably at a pH between about 2 and 4. The heavy metal ions remain dissolved in the acidic solution. Virtually all of the heavy metal ions complexed previously by chelant anions that may be present dissociate from the chelant ions and become free heavy metal cations. The ferrous ions enhance the breaking of chelant attractions to heavy metal ions. The chelant anion attractions are preferentially transferred to dissolved ferrous ions, which are being recycled and reused. The entire contents of this second step product are transferred to the third step.

The third step reaction occurs with caustic soda or soda ash or an alkaline compound such as magnesium hydroxide or lime or the like added to neutralize the acidity and raise the pH of the solution to an intermediate range of between about 7 to 10, preferably between about 6 and 9. This causes all of the heavy metal ions to precipitate as an unusually dense and fast settling solids material. The solids are precipitated as a slurry which is a mixture of ferrous hydroxide and heavy metal hydroxides.

The reactions occurring in the third step of this process proceed according to Equations 3 and 4 as in the following:

$$(Fe^{++})+2(OH^-) \rightarrow Fe(OH)_2 \qquad \text{Equation 3}$$

$$(HM^{++})+2(OH^-) \rightarrow HM(OH)_2 \qquad \text{Equation 4}$$

As free metal cations, both ferrous and heavy metal ions form insoluble hydroxide precipitated solids at slightly acidic to alkaline pH as heavy, dense, fast settling material.

The solids slurry of the third reaction step is withdrawn from the bottom of the settling vessel utilized and is recycled to the first, second and/or third reaction step(s) of the process of this invention. The heavy metal hydroxides dissolve in concentrated heavy metal acidic solutions, contributing an alkali value to the neutralization of the strong acid solutions in accordance with Equation 5.

$$HM(OH)_2+2(H^+) \rightarrow (HM^{++})+2H_2O \qquad \text{Equation 5}$$

The ferrous hydroxide dissolves, forming ferrous ions in the concentrated reaction solution of the first reaction step in accordance with Equation 6.

$$Fe(OH)_2+2(H^+) \rightarrow (Fe^{++})+2H_2O \qquad \text{Equation 6}$$

Additional acid can be added to effect complete sludge solubilization if desired. The heavy metal content of the hydroxide slurry is about 50 to 250 or more times as concentrated as the heavy metal content in the dilute heavy metal solution feeding to the second reaction step. When the slurry is first mechanically de-watered, even higher ratios are obtained and the volume of the recycle is lowered.

Thus, a closed-loop method is disclosed for recycling and reusing the gravity settled slurries of ferrous hydroxide and heavy metal hydroxides produced in the alkaline third step of the process of this invention. The slurries can be recycled to the first, second and third steps of this process and mixed with acidic metal solutions which are partially neutralized by the alkalinity of the hydroxides, saving the cost of purchasing new caustic alkali material.

The heavy metal hydroxides and ferrous hydroxide are dissolved into acidic solution with the concentrated metals. The heavy metals are reclaimed as metallic particles by the reaction of the first step of this process. Recycling of the ferrous containing hydroxide sludge substantially decreases the amount of iron particles needed which dissolve and form ferrous ions. This decreases the raw material cost of iron particles, and minimizes net production and disposal of metal hydroxide sludge.

When treating a dilute acidic solution containing chelated heavy metal ions, the final liquid effluent produced contains lower concentrations of heavy metals when the conversion of ferrous ions to ferric ion is minimized. In one aspect of this invention, a mild reducing agent, other than iron, such as sulfur dioxide, bisulfite ion or sulfite ion or mixtures thereof is added to the dilute acidic waste water to reduce residual oxidizers that may be contained in the water. Such oxidizers such as hydrogen peroxide, sodium persulfate or hypochlorites frequently originate in the reagents used for etching metals. Alternatively, any of these reducing agents comixed into the acidic ferrous ion-containing solution produced after solid heavy metals have been recovered provide a means for introducing the reducing agent into the dilute acidic waste water to be further treated in accordance with this invention.

Referring to the FIG. 1 a stream of concentrated aqueous heavy metal 10, a source of iron particles 12 are introduced into container 16. A recycled ferrous hydroxide-containing slurry 18 which can contain heavy metal hydroxides is introduced from a downstream step 20. Reclaimed heavy metal is removed through stream 22 and recovered through stream 26 by a filter 24 or the like. The liquid effluent 32 from reactor 16 is introduced into reactor 34 and is mixed with dilute heavy metal stream 37 such as is obtained from a rinsing step in a printed circuit production process. Effluent 38 which is acidic and contains heavy metals and ferrous ions is introduced into tank 40 together with caustic from conduit 42 to raise the pH in tank 40 to between about 7 and 10. Effluent 44 is introduced into settling tank 20 to effect separation of an iron hydroxide containing slurry 46 which can contain heavy metal hydroxides from clarified liquid solution 48 which is directed as heavy metal-free liquid effluent 49 which is safe for disposal.

The following examples illustrate the present invention and are not intended to limit the same.

EXAMPLE 1

This example illustrates the recycle process of this invention. The samples of materials used in this test are from an industrial wastewater treatment plant in a printed circuit manufacturing facility. A sample of gravity settled metal hydroxide sluddge with a pH of 8.8 and found to contain 11,500 mg/L of acid soluble iron (ferrous) and 3600 mg/L of acid soluble copper (cupric) is used. A spent sulfuric acid micro-etch sample with a pH of 0.2 and containing 4800 mg/L of dissolved copper is used. A sample of untreated chelated rinsewater feeding to the plant with a pH of 2.8 and containing 32 Mg/L of dissolved copper is used in this example.

A one liter aliquot of a mixture of metal hydroxide sludge (650 mls) and spent acid micro-etch solution (350 mls) are stirred vigorously for one hour. Virtually all of the suspended solids are redissolved, resulting in a blue solution having a pH of 1.7. An amount of finely divided (−325 mesh) iron powder weighing 10 grams is added to this vigorously stirring acidic copper and iron solution.

An immediate change in the appearance of the iron particles occurs, as a metallic copper appearance develops on the particles of iron. This mixture is allowed to stir vigorously for two more hours, and mixing is stopped. A mass of copper colored solids rapidly settles from a greenish colored supernatent liquid produced by the above reaction. One liter of the greenish colored solution (ferrous) is decanted, bottled, and stoppered, leaving all the solids behind in the bottom of the reaction beaker. The solids are rinsed three times, each time with 100 mls of distsilled water, then collected on a filter paper and allowed to air dry for 24 hours. The dried solids are found to weigh 7.2 grams. A sample of these solids is analyzed and found to contain 43% iron and 53% copper by weight.

The entire one liter of supernatent ferrous solution is added to 35 gallons of the chelated rinsewater containing 32 mg/L dissolved copper and mixed for 20 minutes. Aqueous sodium hydroxide solution (10% wt NaOH) is added to increase the pH of this solution to 9.0, causing the precipitation of greenish black solids and forming a dilute slurry of same. After 15 minutes of mixing, a small dose of anionic polymer is added, mixed vigorously for 2 minutes, then allowed to slow mix for 5 minutes, a flocculent mass of fast settling solids separates and settles from a clear aqueous solution in the vessel. An atomic absorption analysis of an unfiltered sample of the clarified treated rinsewater shows a copper content of 0.4 mg/l.

I claim:

1. The process for removing dissolved heavy metals from aqueous solutions containing said heavy metal which comprises (a) in a first reaction step, admixing and reacting a first aqueous solution with iron particles at a pH between about 0.1 and 4 to effect precipitation of said heavy metals from said first solution, separating said precipitated heavy metals from said first solution to form a first liquid effluent from said first reaction step, (b) in a second step, admixing said first liquid effluent with an acidic aqueous solution containing chelated or complexed heavy metals to produce a second liquid effluent containing dissolved heavy metals and dissolved ferrous ions, wherein at least a portion of said dissolved heavy metals are produced by replacement with ferrous ions of said chelated or complexed heavy metals, (c) in a third reaction step, admixing and reacting said second liquid effluent with a water soluble alkali composition to produce a metal hydroxide slurry containing heavy metal hydroxides and ferrous hydroxide and a third liquid effluent, (d) separating said metal hydroxide slurry from said third effluent and (e) recycling said slurry to at least one of said first reaction step, said second step, or said third reaction step.

2. The process of claim 1 wherein said first aqueous solution contains metal ions.

3. The process of claim 1 wherein said first aqueous solution contains dissolved heavy metals in a concentration between about 200 and 50,000 milligrams per liter.

4. The process of claim 1 wherein said first aqueous solution contains industrial metal plating waste.

5. The process of claim 1 wherein said first aqueous solution contains industrial metal etching waste.

6. The process of claim 1 wherein said first aqueous solution contains industrial ion exchange acidic regenerant liquid.

7. The process of claim 1 wherein said first aqueous solution contains metals extracted from ores.

8. The process of claim 1 wherein said first aqueous solution contains metal ions obtained by dissolving metal hydroxides in acid.

9. The process of claim 1 wherein said first aqueous solution contains metal ions obtained by dissolving metal oxides in acid.

10. The process of claim 1 wherein the pH in the first reaction step is between about 0.5 and 2.5.

11. The process of claim 1 wherein the pH in the second reaction step is between about 1 and 5.

12. The process of claim 1 wherein the pH in the third reaction step is between about 6 and 10.

13. The process of claim 1 wherein said heavy metal is a composition containing at least one metal selected from the group consisting of copper, tin, lead, cadmium, cobalt, mercury, chromium, zinc, manganese, silver, gold, platinum, palladium, vanadium, arsenic, antimony, bismuth, indium, rhodium, ruthenium, technetium, molybdenum, niobium, osmium, iridium, uranium, plutonium, a lanthanide and an actinide.

14. The process of claim 1 wherein said iron particles are of a size less than +10 mesh.

15. The process of claim 1 wherein said aqueous composition is an acidic solution of heavy metals.

16. The process of claim 1 wherein said acidic aqueous solution of heavy metals contains chelated metal ions.

17. The process of claim 1 wherein said acidic aqueous solution of heavy metals is contaminated groundwater.

18. The process of claim 1 wherein said acidic aqueous solution of heavy metals is landfill leachate water.

19. The process of claim 1 wherein said acidic aqueous solution of heavy metals is municipal sewerage.

20. The process of claim 1 wherein said acidic aqueous solution of heavy metals is mine shaft drainage water.

21. The process of claim 1 wherein said acidic aqueous solution of heavy metals is slag pile drainage water.

22. The process of claim 1 wherein said acidic aqueous solution of heavy metals is mine tailings pile drainage water.

23. The process of claim 1 wherein said acidic aqueous solution of heavy metals contains dissolved metals in a concentration between about 0.1 and 200 milligrams per liter.

24. The process of claim 1 which comprises adding a reducing agent selected from the group consisting of sulfur dioxide, bisulfite ion, sulfite ion and mixtures thereof to a liquid stream selected from the group consisting of said first liquid effluent, said second effluent and said acidic aqueous solution,.

25. The process of claim 2 which comprises adding a reducing agent selected from the group consisting of sulfur dioxide, bisulfite ion, sulfite ion and mixtures thereof to a liquid stream selected from the group consisting of said first liquid effluent, said second effluent and said acidic aqueous solution.

26. The process of claim 13 which comprises adding a reducing agent selected from the group consisting of sulfur dioxide, bisulfite ion, sulfite ion and mixtures thereof to a liquid stream selected from the group consisting of said first liquid effluent, said second effluent and said first aqueous solution.

27. The process of claim 15 which comprises adding a reducing agent selected from the group consisting of sulfur dioxide, bisulfite ion, sulfite ion and mixtures thereof to a liquid stream selected from the group consisting of said first liquid effluent, said second effluent and said first aqueous solution.

28. The process of claim 16 which comprises adding a reducing agent selected from the group consisting of sulfur dioxide, bisulfite ion, sulfite ion and mixtures thereof to a liquid stream selected from the group consisting of said first liquid effluent, said second effluent and said first aqueous solution.

* * * * *